United States Patent [19]

Shaw

[11] Patent Number: 4,508,171
[45] Date of Patent: Apr. 2, 1985

[54] OIL RECOVERY METHOD

[76] Inventor: James E. Shaw, c/o Phillips Petroleum Company, Bartlesville, Okla. 74004

[21] Appl. No.: 599,862

[22] Filed: Apr. 13, 1984

[51] Int. Cl.$^3$ .............................................. E21B 43/22
[52] U.S. Cl. .................................... 166/273; 166/270; 166/274; 252/8.55 D
[58] Field of Search ............... 166/270, 273, 274, 275, 166/300; 252/8.55 D

[56] References Cited

U.S. PATENT DOCUMENTS

| 3,734,187 | 5/1973 | Norton et al. | 166/274 X |
| 3,760,879 | 9/1973 | Norton et al. | 166/275 |
| 4,473,118 | 9/1984 | Wauquier et al. | 252/8.55 D X |

Primary Examiner—George A. Suchfield

[57] ABSTRACT

Enhanced oil recovery process comprising the injection of an aqueous solution of an aldehyde and a sulfite into a subterranean formation to react with crude oil and form a surfactant in situ. In a preferred embodiment, an aldehyde/sulfite solution is followed by injection of an aqueous alcohol solution and then an aqueous mobility buffer.

14 Claims, No Drawings

OIL RECOVERY METHOD

FIELD OF THE INVENTION

This invention pertains to the recovery of petroleum from subterranean oil-bearing formations. In another aspect, this invention relates to post primary oil recovery employing a surfactant system formed in situ. In accordance with a further aspect, this invention relates to a chemical method of tertiary oil recovery, including chemical modification of crude oil in place to produce surfactants in situ.

BACKGROUND OF THE INVENTION

Oil found within a subterranean formation is recovered or produced through wells called production wells which are drilled into the subterranean formation. Generally, a large amount of the oil is left in the formation if it is produced only by primary depletion, i.e., where only formation energy is employed in recovering the oil. Only a small fraction of the original oil-in-place in a hydrocarbon-bearing reservoir is expelled by primary production or natural mechanisms. Where the initial formation energy is inadequate or has become depleted through production from the well, supplemental processes referred to as secondary, and tertiary, and quaternary recovery operations are utilized in order to recover a larger percentage of the in-place oil. Waterflooding and surfactantflooding are processes well known in the art to recover the vast quantities of oil which remain in the formation after primary oil recovery operations. Designing new surfactant systems of high oil recovery efficiency and good phase stability remains a goal in this technology. This invention relates to chemicals suitable for use in enhanced recovery of crude oils from subterranean formations.

It is an object of this invention to provide new chemical compositions useful in oil recovery.

A further object of this invention is to produce another surfactant system useful in surfactantflooding. Particularly, the surfactant system should be useful in environments comprising hard brines.

Yet another object of this invention is to provide an oil recovery process using the system of this invention.

These and other objects, advantages, details, features and embodiments of this invention will become apparent to those skilled in the art from the following detailed description of the invention and the appended claims.

THE INVENTION

In accordance with the present invention, it has now been discovered that improvements in recovery of fluid hydrocarbons such as petroleum from subterranean petroleum bearing formations is achieved by introducing into the formation an alkaline slug containing sulfite and an aldehyde to react with crude oil and produce surfactant compounds in situ in the oil bearing formation, and thereafter causing the so-injected slug to move from an injection well towards one or more production wells, displacing oil present in the formation.

In accordance with one specific embodiment of the invention, an enhanced oil recovery process is provided comprising the sequential injection of (a) an alkaline solution containing an aldehyde and a sulfite, e.g., formaldehyde and an alkali metal sulfite, (b) an aqueous solution of an alcohol and (c) an aqueous mobility buffer composition.

In one embodiment of the invention, the mobility buffer solution is an aqueous solution containing a polymeric viscosifier or other thickening agent that can be graded back by continuous dilution to a particularly desired level of polymeric viscosifier or thickening agent.

DETAILED DESCRIPTION OF THE INVENTION

The present invention concerns an improved process for the recovery of oil in which an aqueous fluid is injected into an oil-bearing formation and displaced oil is recovered from the same formation. Particularly, the invention concerns incorporating into the aqueous injection fluid, a small but effective amount of a water soluble sulfite or bisulfite, or metabisulfite, such as, potassium, sodium, or ammonium sulfite and a water-soluble aldehyde.

The water-soluble aldehydes include those aldehydes containing 1 to about 5 carbon atoms. Preferably, the aldehyde is either formaldehyde or paraformaldehyde or an equilibrium mixture thereof.

The amount of water-soluble sulfite and water-soluble aldehyde present in the aqueous alkaline solution injected into the formation will generally be a molar ratio of sulfite to formaldehyde ranging from about 0.1:1 to about 2:1. An excess of formaldehyde is preferred.

The aqueous solution of aldehyde and sulfite ordinarily will contain sufficient alkaline material to provide a pH of at least about 7.5, preferably 10 to 12.

The aqueous solution of aldehyde and sulfite can be saline, hard brine, or fresh water.

Following injection of the solution containing sulfite and aldehyde into the formation, an aqueous solution of a suitable alcohol such as isopentyl alcohol is injected. Other alcohols that can be used in addition to isopentyl alcohol include isobutyl alcohol, isopropyl alcohol, 1-butanol, 1-pentanol, and the like, and mixtures thereof. Broadly, water-soluble alcohols having from 1 to about 6 carbon atoms are employed.

Following injection of the aqueous slug containing sulfite and aldehyde to form a surfactant in situ, it is followed by injection of an aqueous alcoholic solution. It is presently preferred, although not necessary, to inject a mobility buffer solution into the reservoir. This buffer helps prevent fingering and enhances the efficiency of the oil recovery. Buffer solutions are aqueous solutions of polymeric viscosifiers or other thickening agents. Examples of useful mobility buffers are aqueous fluids containing mobility reducing agents, such as high molecular weight partially hydrolyzed polyacrylamides, biopolysaccharides, soluble cellulose ethers, and the like. The mobility buffer comprises 50 to 20,000, preferably 200 to 5,000 ppm of the mobility reducing agent in the fluid.

The concentration of thickening agent in the mobility buffer fluid can remain constant over the injection period or the mobility buffers slug can be "graded", i.e., the viscosifier concentration starts out at a relatively high level at the beginning of the injection and the concentration tapers off toward the end of the injection period. As an example, the aqueous mobility buffer slug can start with a concentration of 2500 ppm of polyacrylamide and be graded back by continuous dilution to 250 ppm of polyacrylamide. The "grading" of mobility buffer fluids is well known in the art.

A cosurfactant other than an alcohol can be used. The cosurfactant could be an alcohol, phenol, mercaptan, or gycol of 1–18 carbon atoms per molecule which has been ethoxylated or propoxylated with 1 to 12 ethylene oxide propylene oxide units per molecule. The preferred cosurfactants are ordinary alcohols of 3 to 5 carbons like isopropyl alcohol, isobutyl alcohol, isopentyl alcohol, 1-pentanol, and 1-butanol. The present invention can be utilized for a variety of subterranean reservoirs including reservoirs containing hard brine connate water.

In actual operation the compositions of the invention can be injected into subterranean formations in several different ways. For example, in one embodiment the process comprises injecting step-wise (1) an aqueous sulfite-formaldehyde solution, (2) an aqueous alcohol solution, and (3) a mobility buffer solution. It is also within the scope of the invention to inject an aqueous solution of sulfite, formaldehyde and alcohol followed by a mobility buffer solution. Similarly, the alcohol can be combined with the mobility buffer solution rather than the sulfite-formaldehyde solution. In other words, the alcohol does not have to be injected as a separate slug.

It is also within the scope of the invention to include alkaline materials in the compositions of the invention in amounts sufficient to provide the desired alkalinity. Suitable alkaline materials include ammonia, compounds of alkali metals such as hydroxides, carbonates, bicarbonates, orthosilicates, silicates, phosphates, and borates or other known alkaline materials. The carbonates, such as sodium carbonate, are often used for this purpose.

The following examples are intended to further illustrate the invention without unduly limiting the scope thereof.

EXAMPLE I

This example demonstrates the oil recovery effectiveness of the inventive in-situ sulfoalkylation system. Waterflood residual oil from an epoxy coated waterwet Berea sandstone core was recovered by using the sequential injection of (a) an aqueous alkaline slug of sodium sulfite and formaldehyde, (b) an aqueous alkaline alcohol slug and (c) thickened aqueous mobility buffer graded back logarithmically to the 0.3 weight percent aqueous carbonate.

The initial slug had the following composition:
24.3 g aqueous formaldehyde (37 wt. % HCHO)
27.0 g sodium sulfite
4.5 g sodium carbonate
9.0 g sodium chloride
835 mL distilled water Thus, each component was present in the following concentrations:
HCHO: 1.0 wt. %
$Na_2SO_3$: 3.0 wt. %
$Na_2CO_3$: 0.5 wt. %
NaCl: 1.0 wt. %
$H_2O$: 94.5 wt. %

The second slug had the following composition:
3.0 g NaCl
2.0 g $Na_2CO_3$
6.0 g Isopentyl Alcohol
191 mL Distilled Water Thus, each component was present in the following approximate concentrations:
NaCl: 1.5 wt. %
$Na_2CO_3$: 1.0 wt. %
Isopentyl Alcohol: 3.0 wt. %
Water: 95 wt. %

The mobility buffer slug stock solution was prepared by dissolving 0.96 g Betz Hi Vis polyacrylamide and 1.5 g sodium carbonate in about 500 mL of distilled water. A 127.5 mL (0.5 PV) portion of the above solution (ca. 1900 ppm polyacrylamide) was injected as the third slug and was graded back logarithmically with 0.3 weight percent aqueous sodium carbonate solution.

The pore volume of the 3" diameter × 12" cylindrical Berea sandstone core was 254.9 mL. In this run, a 578.6 mL (2.27 pore volumes) slug of the initial formaldehyde/sulfite solution was injected followed by 86.2 mL (0.33 PV) of the aqueous alcohol caustic slug and 0.5 PV (ca. 128 mL) of the aqueous polyacrylamide mobility buffer.

In preparing the core, 188.6 mL of water was displaced from the water-saturated core by oilflood indicating the introduction of about 188.6 mL of oil into the core. Subsequent waterflood resulted in approximately 96.5 mL of oil being displaced from the core leaving about 92.1 mL of waterflood residual oil in the Berea sandstone core prior to the instant flooding procedure.

In the course of the inventive flood procedure, a total effluent of 5 pore volumes (ca. 1275 mL) was collected which contained 43.3 mL of tertiary oil representing 47 percent of the waterflood residual oil.

EXAMPLE II

This comparative example demonstrates the very poor oil recovery efficiency of a system wherein sodium sulfite is not present in the initial slug.

The initial slug had the following composition:
24.3 g aqueous formaldehyde (37 wt. % HCHO)
4.5 g sodium carbonate
36.0 g sodium chloride
835 mL Distilled Water Thus, each component was present in the following concentrations:
HCHO: 1.0 wt. %
$Na_2CO_3$: 0.5 wt. %
NaCl: 4.0 wt. %
$H_2O$: 94.5 wt. %

The second slug had the following composition:
3.0 g NaCl
2.0 g $Na_2CO_3$
6.0 g Isopentyl Alcohol
191 mL Distilled Water Thus, each component was present in the following approximate concentrations:
NaCl: 1.5 wt. %
$Na_2CO_3$: 1.0 wt. %
Isopentyl Alcohol: 3.0 wt. %
Water: 95 wt. %

The mobility buffer slug stock solution was prepared by dissolving 0.96 g Betz Hi Vis polyacrylamide and 1.5 g sodium carbonate in about 500 mL of distilled water. A 139.7 mL (0.5 PV) portion of the above solution (ca. 1900 ppm polyacrylamide) was injected as the third slug and was graded back logarithmically with 0.3 weight percent aqueous sodium carbonate solution.

The pore volume of the 3" × 12" cylindrical Berea sandstone core was 279.4 mL. In this run, a 719.4 mL (2.5 pore volumes) slug of the initial formaldehyde solution was injected followed by 90.1 mL (0.32 PV) of the aqueous alcohol caustic slug and 0.5 PV (ca. 140 mL) of the aqueous polyacrylamide mobility buffer.

In preparing the core, 206.8 mL of water was displaced from the water-saturated core by oilflood indicating the introduction of about 206.8 mL of oil into the core. Subsequent waterflood resulted in approximately 111.8 mL of oil being displaced from the core leaving about 95 mL of waterflood residual oil in the Berea sandstone core prior to the flooding procedure of this control run.

In the course of this control run procedure, a total effluent of 4.1 pore volumes (ca. 1141 mL) was collected which contained 4 mL of tertiary oil representing about 4 percent of the waterflood residual oil.

EXAMPLE III

This comparative example demonstrates the very poor oil recovery efficiency of a system wherein formaldehyde is not present in the initial slug.

The initial slug had the following composition:
27.0 g sodium sulfite
4.5 g sodium carbonate
9.0 g sodium chloride
859.5 g distilled water Thus, each component was present in the following concentrations:
$Na_2SO_3$: 3.0 wt. %
$Na_2CO_3$: 0.5 wt. %
NaCl: 1.0 wt. %
$H_2O$: 95.5 wt. %

The second slug had the following composition:
3.0 g NaCl
2.0 g $Na_2CO_3$
6.0 g Isopentyl Alcohol
191 g Distilled Water Thus, each component was present in the following approximate concentrations:
NaCl: 1.5 wt. %
$Na_2CO_3$: 1.0 wt. %
Isopentyl Alcohol: 3.0 wt. %
Water: 95 wt. %

The mobility buffer slug stock solution was prepared by dissolving 0.96 g Betz Hi Vis polyacrylamide and 1.5 g sodium carbonate in about 500 mL of distilled water. A 136.4 mL (0.5 PV) portion of the above solution (ca. 1900 ppm polyacrylamide) was injected as the third slug and was graded back logarithmically with 0.3 weight percent aqueous sodium carbonate solution.

The pore volume of the 3"×12" cylindrical Berea sandstone core was 272.8 mL. In this run, a 647.3 mL (2.37 pore volumes) slug of the initial sodium sulfite solution was injected followed by 87.3 mL (0.32 PV) of the aqueous alcohol caustic slug and 0.5 PV (ca. 136 mL) of the aqueous polyacrylamide mobility buffer.

In preparing the core, 198.7 mL of water was displaced from the water-saturated core by oilflood indicating the introduction of about 198.7 mL of oil into the core. Subsequent waterflood resulted in approximately 99 mL of oil being displaced from the core leaving about 100 mL of waterflood residual oil in the Berea sandstone core prior to the flooding procedure of this control run.

In the course of this control run procedure, a total effluent of 3.7 pore volumes (ca. 1013 mL) was collected which contained 2.5 mL of tertiary oil representing about 2.5 percent of the waterflood residual oil.

The results of the runs described in Examples I, II and III are summarized in Table I.

TABLE I
Sulfoalkylation Procedure for Enhanced Oil Recovery

| Example No. | Type of Run | Components in Initial Slug | % Tertiary Oil Recovery |
|---|---|---|---|
| I | Invention | $HCHO/Na_2SO_3$ | 47 |
| II | Control | HCHO | 4 |
| III | Control | $Na_2SO_3$ | 2.5 |

I claim:

1. A process for the recovery of oil from an oil bearing subterranean formation penetrated by at least one injection well and at least one production well which comprises:
   (a) injecting a slug of an aqueous alkaline solution containing a water-soluble sulfite and a water-soluble aldehyde through an injection well under conditions to cause sulfoalkylation of oil in the formation and produce a surfactant in situ;
   (b) causing the so-injected slug to move from the injection well towards one or more production wells displacing oil present in said formation, and
   (c) recovering displaced oil from at least one of said production wells.

2. A process according to claim 1 wherein a slug of an aqueous alcohol solution is injected into the formation following said slug containing sulfite and aldehyde.

3. A process according to claim 2 wherein a mobility buffer fluid is injected into said subterranean formation following said slug of aqueous alcohol solution.

4. A process according to claim 3 wherein an aqueous drive fluid is injected into said subterranean formation following said mobility buffer fluid.

5. A process according to claim 3 wherein said mobility buffer comprises polyacrylamide graded back with aqueous sodium carbonate solution.

6. A process according to claim 2 wherein said alcohol solution comprises sodium chloride, sodium carbonate and isopentyl alcohol.

7. A process according to claim 2 wherein each slug of sulfite and aldehyde and slug of alcoholic solution is an aqueous brine.

8. A process according to claim 2 wherein said slug in (a) comprises formaldehyde, sodium sulfite, sodium carbonate, sodium chloride and water and said alcohol slug comprises sodium chloride, sodium carbonate, isopentyl alcohol, and water.

9. A process according to claim 8 wherein a mobility buffer slug comprising polyacrylamide, sodium carbonate and water is injected following said alcohol slug.

10. A process according to claim 9 wherein said mobility buffer solution is graded back logarithmically with 0.3 weight percent aqueous sodium carbonate solution.

11. A process according to claim 1 wherein said aqueous slug is injected into a formation containing hard brine.

12. A process according to claim 1 in which said slug contains a water soluble alcohol.

13. A process according to claim 1 wherein said slug in (a) comprises formaldehyde, sodium sulfite, sodium carbonate and sodium chloride.

14. A process according to claim 1 wherein a mobility buffer solution containing an alcohol is injected into said formation following said slug containing sulfite and formaldehyde.

* * * * *

UNITED STATES PATENT AND TRADEMARK OFFICE
CERTIFICATE OF CORRECTION

PATENT NO. : 4,508,171

DATED : April 2, 1985

INVENTOR(S) : JAMES E. SHAW

It is certified that error appears in the above-identified patent and that said Letters Patent is hereby corrected as shown below:

On the title page;

Assignee on face of patent should be PHILLIPS PETROLEUM CO.

Signed and Sealed this

Sixth Day of August 1985

[SEAL]

Attest:

DONALD J. QUIGG

Attesting Officer     Acting Commissioner of Patents and Trademarks